US007751424B2

(12) United States Patent
Nagai et al.

(10) Patent No.: US 7,751,424 B2
(45) Date of Patent: Jul. 6, 2010

(54) METHOD AND APPARATUS FOR PACKET TRANSMISSION IN CARRIER-SENSE-MULTIPLE-ACCESS NETWORK

(75) Inventors: Yukimasa Nagai, Tokyo (JP); Hiroyoshi Suga, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 909 days.

(21) Appl. No.: 10/552,274

(22) PCT Filed: May 14, 2004

(86) PCT No.: PCT/JP2004/006862

§ 371 (c)(1),
(2), (4) Date: Oct. 4, 2005

(87) PCT Pub. No.: WO2004/102888

PCT Pub. Date: Nov. 25, 2004

(65) Prior Publication Data

US 2007/0025288 A1   Feb. 1, 2007

(30) Foreign Application Priority Data

May 15, 2003   (JP)   ............................. 2003-137746

(51) Int. Cl.
*H04L 12/413*   (2006.01)
(52) U.S. Cl. ...................... 370/445; 370/458
(58) Field of Classification Search ................ 370/310, 370/310.2, 328, 338, 346, 349, 350, 431, 370/445, 449, 448, 458, 459, 461, 462, 454, 370/450, 447
See application file for complete search history.

(56) References Cited

U.S. PATENT DOCUMENTS

| 5,592,483 | A | * | 1/1997 | Hieda et al. | .................. 370/445 |
| 5,844,905 | A | * | 12/1998 | McKay et al. | .............. 370/443 |
| 6,556,582 | B1 | * | 4/2003 | Redi | .......................... 370/443 |
| 7,002,910 | B2 | * | 2/2006 | Garcia-Luna-Aceves et al. | .......................... 370/229 |

FOREIGN PATENT DOCUMENTS

| JP | 62-284531 A | 12/1987 |
| JP | 2001-345809 A | 12/2001 |
| JP | 2002-64503 A | 2/2002 |
| JP | 2002-353975 A | 12/2002 |

(Continued)

OTHER PUBLICATIONS

Takaki Uta et al., Central Research Lab., Hitachi Ltd. Integrated Wireless LAN Access System, (2002) p. 485.

(Continued)

*Primary Examiner*—Brenda Pham
(74) *Attorney, Agent, or Firm*—Birch, Stewart, Kolasch & Birch, LLP

(57) ABSTRACT

A communication method for a CSMA network including a radio terminal and a base station supporting RTS/CTS, includes: the base station transmitting an RTS frame to the radio terminal during a transmission-suspend-period in which the radio terminal suspends transmission to prevent a collision of packets; the radio terminal transmitting an RTR frame to the base station after the transmission-suspend-period has elapsed; and the base station transmitting a data frame to the radio terminal in response to the RTR frame.

30 Claims, 13 Drawing Sheets

FOREIGN PATENT DOCUMENTS

WO     WO 2004/006444 A1     1/2004

OTHER PUBLICATIONS

Akira Yamada et al., Enhancement of Mesh Network Oriented IEEE802.11 MAC Protocol, Wireless Laboratories, (2004) p. 736.

Matsumoto et al., "LDPC coded Hybrid Type II ARQ System," Symsposium on Information Theory and Its Applications, pp. 273-276, (2003), XP002990209.

Matsumoto et al., "Irregular Low-Density Parity-Check Code Design Based on Euclidean Geometries," IEICE Trans. Fundamentals, vol. E86-A, No. 7, pp. 1820-1834, (2003), XP001174812.

Li et al., "Rate-Compatible Low Density Parity Check Codes for Capacity-Approaching ARQ Schemes in Packet Data Communications," Proceedings of the lasted International Conference Communications, Internet and Information Technology, pp. 201-206, (2002), XP002339009.

Matsumoto et al., "Irregular extended Euclidean geometry low-density parity-check codes," International Symposium on Communication Systems Networks and Digital Signal Processing, pp. 148-151, (2002), XP0022370884.

Matsumoto et al., "Fundamentals and Applications of Construction Methods of Low-Density Parity-Check Codes," Institute of Electronics, Information and Communication Engineers Society Taikai Koen Ronbunshu, pp. SS17-SS18, (2003), XP002998474.

Matsumoto et al., "Determine irregular low-density parity-check codes design scheme," Proceedings at Kiso Kyokai Society Meeting, vol. A-6-12, p. 126, (2002), XP002903378.

Matsumoto et al., "Irregular Low-Density Parity-Check Code Design based on Integer Lattics," IEEE International Symposium on Information Theory, p. 3, (2003), XP010657031.

Chung et al., "Analysis of Sum-Product Decoding of Low-Density Parity-Check Codes Using a Guassian Approximation," IEEE Transactions on Information Theory, vol. 47, No. 2, pp. 657-670, (2001), XP002969535.

Decision of a Patent Grant from Japanese Appl. No. 2005-506257, issued Jun. 23, 2009.

* cited by examiner

FIG.2

RTR

| PACKET TYPE (RTR) | DESTINATION ADDRESS | SENDER ADDRESS | CHANNEL USE PERIOD | ERROR CHECKING CODE |

FIG.3

| PACKET TYPE (RTS) | DESTINATION ADDRESS | SENDER ADDRESS | CHANNEL USE PERIOD | ERROR CHECKING CODE |

RTS

METHOD AND APPARATUS FOR PACKET TRANSMISSION IN CARRIER-SENSE-MULTIPLE-ACCESS NETWORK

TECHNICAL FIELD

The present invention relates to a communication method for a digital radio communication system adopting carrier-sense multiple access (CSMA), which is one of the random access technologies, and more specifically, the invention relates to a communication method capable of avoiding a collision of wireless packets due to the influence of a hidden terminal.

BACKGROUND ART

The conventional communication method will be explained first. The CSMA, which is one of the random access technologies, is adopted, for example, in a communication system performing wireless packet communication and the like. In the CSMA, a plurality of radio terminals constituting the system performs carrier-senses for a radio channel prior to wireless packet transmission. When it is recognized that the channel is being used (channel busy), transmission of the wireless packet is suspended, and thereafter, when it is recognized that the channel is not being used (channel idle), the wireless packet is transmitted.

In this communication system, however, there are cases that a transmission signal from another radio terminal cannot be directly received, such as a case that the radio terminals are located with such a distance therebetween that radio waves do not reach, or a case that there is an obstacle, which blocks radio waves, between the radio terminals. The radio terminal whose presence cannot be recognized, in spite of constituting the same communication system, is referred to as a "hidden terminal". Since the carrier sense does not work effectively between the radio terminals corresponding to the hidden terminals, there is a case that one terminal starts transmission of a wireless packet, while the other is transmitting a wireless packet, and in such a case, for example, a collision of wireless packets occurs in a radio base station located at an intermediate position between the radio terminals, thereby disabling normal communication.

In Wireless LAN Standard IEEE802.11, the problem of hidden terminals is remedied by request-to-send (RTS)/clear-to-send (CTS) of a distributed coordination function (DCF) using the carrier sense multiple access/collision avoidance (CSMA/CA).

A communication method between a base station (AP) and a radio terminal (STA) in a wireless LAN system adopting the CSMA will be explained below. It is assumed here that communication is performed in such a state that STA (1) belongs to AP (1), and STA (2) belongs to AP (2). The STA (2) is in a communication range of the STA (1), and the STA (1) is in an interference range of the STA (2). A packet format of the RTS and the CTS used in the system includes a packet type field for discriminating the packets of RTS and CTS from each other, a destination address field, a sender address field (not in the CTS), a channel use period field by a transmitted wireless packet, and an error-checking-code field for checking a bit error in the packet.

Firstly, the AP (1) transmits an RTS frame, which is a control frame, to the STA (1). The STA (1) transmits a CTS frame to the AP (1). The respective frames include virtual carrier sense information referred to as a net allocation vector (NAV), indicating, for example, the channel use period in the communication with a radio terminal corresponding to the destination address. Therefore, transmission from a radio terminal other than the destination address is suspended until the time (period) specified in the NAV. That is, here, the STA (2) is in the transmission-suspended state.

The AP (1) having received the CTS frame then transmits a DATA frame to the STA (1). The STA (1) having received the DATA frame sends back an ACK frame to the AP (1).

On the other hand, the STA (2) having received the CTS frame from the STA (1) cannot send back the CTS frame even when it has received the RTS frame from the AP (2), since it is in the transmission-suspended state by the NAV. Since the CTS frame is not sent back from the STA (2), the AP (2) retransmits the RTS frame until the transmission-suspended state of the STA (2) is cancelled. When the number of retransmission reaches a preset upper limit, the AP (2) can cancel the frame.

When the AP (2) retransmits the RTS frame to the STA (2) in the state that the channel use period is expired and the transmission-suspended state is cancelled, the STA (2) transmits the CTS frame to the AP (2). The AP (2) having received the CTS frame transmits a DATA frame to the STA (2), and the STA (2) having received the DATA frame sends back the ACK frame to the AP (2).

Thus, in the conventional wireless LAN system, a plurality of radio terminals is connected to a plurality of base stations operating in the same frequency, and when there is a hidden terminal due to the interference between the radio terminals connected to different base stations, a collision of packets can be avoided by the RTS/CTS.

In the conventional communication method, however, for example, the STA (2) is turned to the transmission-suspended state due to the NAV of the STA (1) connected to the other AP (1) operating in the same frequency. Therefore, in the transmission-suspended state, the STA (2) cannot transmit the ACK frame, even when it can receive the DATA frame from the AP (1), thereby causing a drop in the throughput considerably.

As a method of avoiding a drop in the throughput, for example, there are a method of controlling a downlink and an uplink timewise by synchronizing a plurality of base stations, and a method of adjusting the distance between the base stations. However, with these methods, there is a problem in that a plurality of companies or individuals cannot install the base station at random.

The present invention has been achieved in order to solve the above problems. It is an object of the present invention to provide a communication method capable of avoiding a drop in the throughput, without performing synchronous control between the base stations and distance adjustment between the base stations.

DISCLOSURE OF INVENTION

A communication method according to the present invention, which is a communication method for a carrier-sense-multiple-access (CSMA) network including a radio terminal and a base station to which the radio terminal belongs and supports request-to-send/clear-to-send (RTS/CTS) to prevent a collision of packets due to a hidden terminal, includes: RTS-transmitting including the base station transmitting a request-to-send (RTS) frame to the radio terminal during a transmission-suspend-period in which the radio terminal suspends transmission to prevent the collision of packets; RTR-transmitting including the radio terminal transmitting a request-to-receive (RTR) frame to the base station after the transmission-suspend-period has elapsed; and data-transmitting including the base station transmitting a data frame to the radio terminal in response to the RTR frame.

According to the present invention, when a particular radio terminal is in the transmission-suspended state due to the influence of a hidden terminal, although there is an access from the base station, the radio terminal transmits the RTR frame for requesting the base station to retransmit the DATA frame, which could not be received before, at the time of shifting to the transmission-enabled state, and the base station retransmits the past DATA frame.

BRIEF DESCRIPTION OF DRAWINGS

FIG. 2 depicts a format of a request-to-receive (RTR) frame;

FIG. 3 depicts a frame format of a request-to-send (RTS) frame;

BEST MODE(S) FOR CARRYING OUT THE INVENTION

Exemplary embodiments of a communication method according to the present invention will be explained below in detail with reference to the accompanying drawings.

Figure 1:
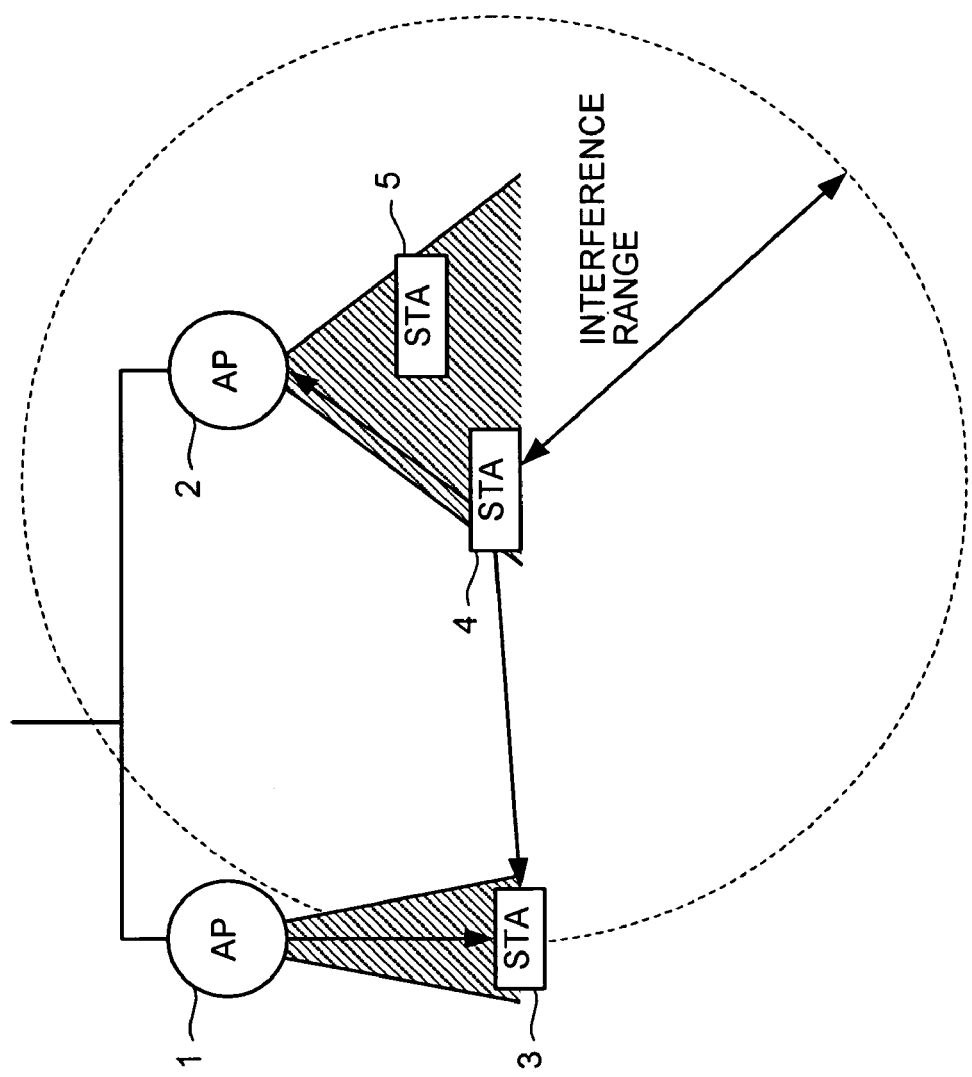
FIG. 1 depicts the configuration of a communication system capable of realizing a communication method according to the present invention.

FIG. 1 depicts the configuration of a communication system capable of realizing the communication method according to the present invention, in which the communication status between a base station (AP) and a radio terminal (STA) is shown. In this communication system, a case that packet communication is carried out in the state that an STA3 belongs to an AP1, and an STA4 and an STA5 belong to an AP2 is assumed. The STA4 is located in the communication range of the STA3, and the STA3 is located in an interference range of the STA4.

Figure 4:
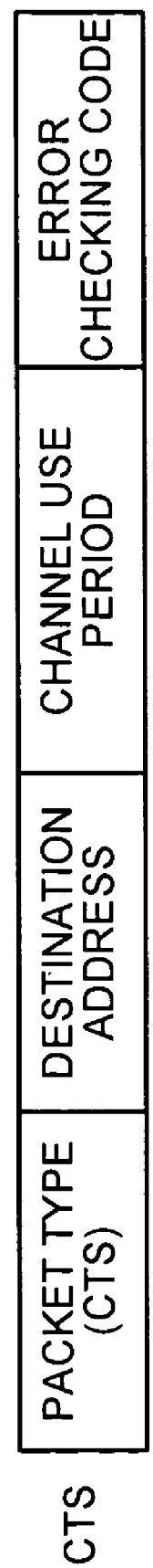
FIG. 4 depicts a frame format of a clear-to-send (CTS) frame.

FIG. 2 depicts a request-to-receive (RTR) format according to a first embodiment of the present invention. The RTR frame includes a packet type field for discriminating the packets (RTR, RTS, and CTS) from each other, a destination address field, a sender address field, a channel use period field indicating the use period of a channel by the wireless packet, and an error-checking-code field added with a calculation result for checking a bit error in the packet. FIG. 3 depicts a frame format of the RTS as in the conventional method, and FIG. 4 depicts a frame format of the CTS as in the conventional method. The RTS frame and the CTS frame respectively include a packet type field for discriminating the packets, a destination address field, a sender address field (not in the CTS), a channel use period field indicating the use period of a channel by the wireless packet, and an error-checking-code field added with a calculation result for checking a bit error in the packet. Detailed fields in IEEE802.11 and fields commonly added to the respective wireless packets depending on modulation and demodulation methods and the like are omitted.

Figure 5:
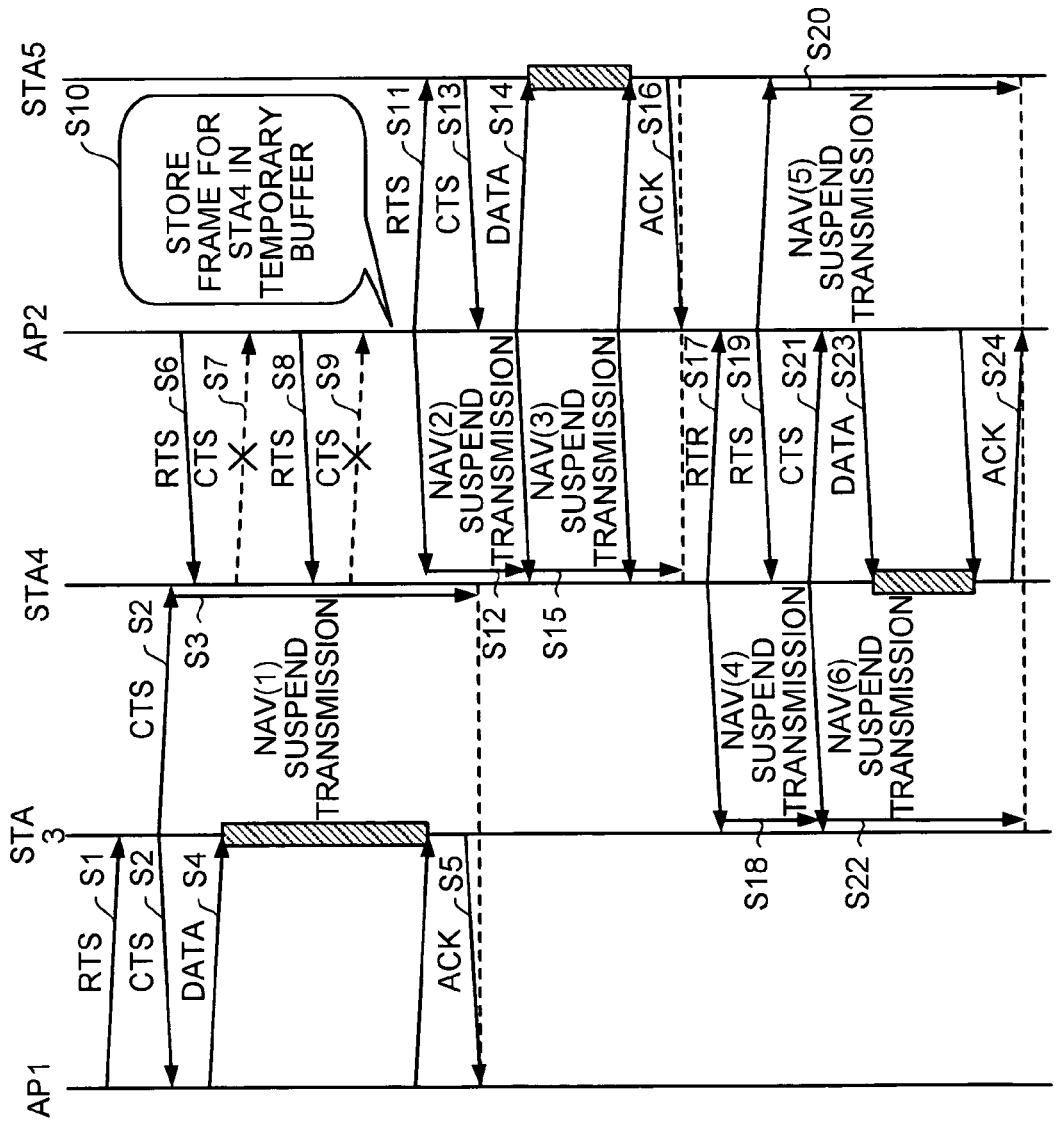
FIG. 5 depicts a communication method according to a first embodiment.

The communication method according to the first embodiment will be specifically explained below with reference to the accompanying drawings. FIG. 5 depicts the communication method according to the first embodiment. An example of a communication method between a base station (AP) and a radio terminal (STA) in a wireless LAN system in conformity with IEEE802.11 will be explained below. A time axis is plotted on the Y-axis, and arrows express the shift of a frame from the AP to the STA, or a frame from the STA to the AP.

Firstly, the AP1 transmits an RTS frame, which is a control frame in IEEE802.11, to the STA3 (step S1 in FIG. 5). The STA3 transmits a CTS frame to the AP1 (step S2). The respective frames include virtual carrier sense information referred to as NAV, which indicates a channel use period in the communication with, for example, a radio terminal corresponding to the destination address. Therefore, radio terminals other than the destination address are turned to a transmission-suspended state until the time specified in the NAV. That is, since the STA4 is in the communication range of the STA3, the STA4 is turned to the transmission-suspended state (step S3).

The AP1 having received the CTS frame transmits a DATA frame to the STA3 (step S4). The STA3 having received the DATA frame sends back an ACK frame to the AP1 (step S5). According to the IEEE802.11, RTS/CTS is used as the method of solving the problem of a hidden terminal.

On the other hand, the STA4 having received the CTS frame from the STA3 in the processing at step S2 is turned to the transmission-suspended state (step S3). Therefore, even when having received the RTS frame from the AP2 (step S6), the STA4 cannot send back the CTS frame to the AP2 (step S7). Since the CTS frame is not sent back to the AP2 even after the predetermined time has passed, the AP2 retransmits the RTS frame (step S8). The STA4 cannot send back the CTS frame to the AP2, since it is still in the transmission-suspended state (step S9).

In the first embodiment, when the number of retransmission reaches two, the AP2 temporarily stores the DATA frame for the STA4, for example, in a predetermined buffer (step S10). If there is DATA for another STA, the AP2 handles the communication with the other STA preferentially. As shown in FIG. 5, the AP2 gives priority to the communication with an STA5, and transmits the RTS frame to the STA5 (step S11). On the other hand, for example, when the channel use period is ahead of the time indicated by the CTS frame at step S2, according to the NAV included in the RTS frame at step S11 (step S12), the STA4 extends the transmission-suspend-period. While a case that the number of retransmission is two is explained in the first embodiment as an example, the number of retransmission is not limited thereto.

The STA5 having received the RTS frame in the processing at step S11 transmits the CTS frame to the AP2 (step S13). The AP2 having received the CTS frame transmits the DATA frame to the STA5 (step S14). On the other hand, STA4 extends the transmission-suspend-period based on the NAV included in the DATA frame addressed to the STA5 (step S15). Thereafter, the STA5 having received the DATA frame sends back the ACK frame to the AP2 (step S16). At this point in time, the transmission-suspended state of the STA4 renewed at step S15 is cancelled, and the STA4 is turned to a transmission-enabled state.

The STA4 could not transmit the CTS frame due to the influence of a hidden terminal in spite of having received the RTS frame from the AP2 in the past (steps S6 and S8). Therefore, the STA4 now in the transmission-enabled state transmits the RTR frame for requesting retransmission of the RTS frame to the AP2 (step S17). On the other hand, the STA3 is turned to the transmission-suspended state, for example, until the reception finish time of the CTS frame from the STA4, based on the NAV included in the RTR frame at step S17 (step S18).

The AP2 having received the RTR frame in the processing at step S17 transmits the RTS frame to the STA4 in response thereto (step S19). On the other hand, the STA5 is turned to the transmission-suspended state, for example, until the reception processing of the STA4 finishes, based on the NAV included in the RTS frame at step S19 (step S20).

The STA4 having received the RTS frame in the processing at step S19 transmits the CTS frame to the AP2 (step S21). On the other hand, STA3 extends the transmission-suspend-period based on the NAV in the CTS frame to the AP2 (step S22).

The AP2 having received the CTS frame in the processing at step S21 reads the DATA frame temporarily stored in the processing at step S10 and transmits the DATA frame to the STA4 (step S23). Lastly, the STA4 having received the DATA frame sends back the ACK frame to the AP2 (step S24). At this point in time, the transmission-suspended state of the STA3 and the STA5 is cancelled, and changed to the transmission-enabled state.

In the first embodiment, a case that a hidden terminal appears due to a radio terminal connected to the base station operating in the same frequency has been explained. However, the present invention is not limited thereto, and for example, when a radio terminal cannot perform transmission processing since the base station operating in the same frequency operates in the interference range, the similar procedure can be applied. Furthermore, even when a radio terminal receives a frame from the base station connected by carrier sense but is turned to the transmission-suspended state immediately after receiving the frame, the same procedure can be applied by transmitting the RTR frame when the radio terminal is turned to the transmission-enabled state.

Even in a sequence in which the RTS/CTS procedure is not carried out as the measure against the hidden terminal, the similar procedure can be applied by transmitting the RTR frame. In this case, the processing at steps S6 to S9 is replaced by the retransmission processing of the DATA frame, and after the transmission of the RTR frame, only the processing at step S23 (DATA frame) and at step S24 (ACK frame) is carried out. Furthermore, the similar procedure can be applied not only to the upward traffic from the radio terminal, but also to the downward traffic from the base station. In the configuration of the communication system, it is assumed herein that the base station can be a particular radio terminal, and a radio terminal can be the base station. While the access method based on the CSMA/CA has been explained in this embodiment, the similar procedure can be also applied to an access method based on polling control, by reserving polling time within the RTR frame and reserving delivery of the reception frame.

Thus, in the first embodiment, when a particular radio terminal is in the transmission-suspended state due to the influence of a hidden terminal, in spite of having an access from the base station, the radio terminal transmits the RTR frame for requesting the base station to retransmit the DATA frame, which the radio terminal could not receive, when the radio terminal is turned to the transmission-enabled state, so that the base station retransmits the past DATA frame. Accordingly, since the downlink packet from the base station can be efficiently received, a considerable drop in the throughput can be avoided without establishing synchronization of downlink/uplink between the base stations. Furthermore, since this method has compatibility with the IEEE802.11, a conventional WLAN card can be used.

A communication method according to a second embodiment of the present invention will now be explained. Since the configuration of the communication system is the same as that of FIG. 1 in the first embodiment, like reference numerals are designated with like parts, and explanation thereof is omitted. The respective frame formats used in the second embodiment are the same as those of FIGS. 2, 3, and 4 in the first embodiment.

Figure 6:
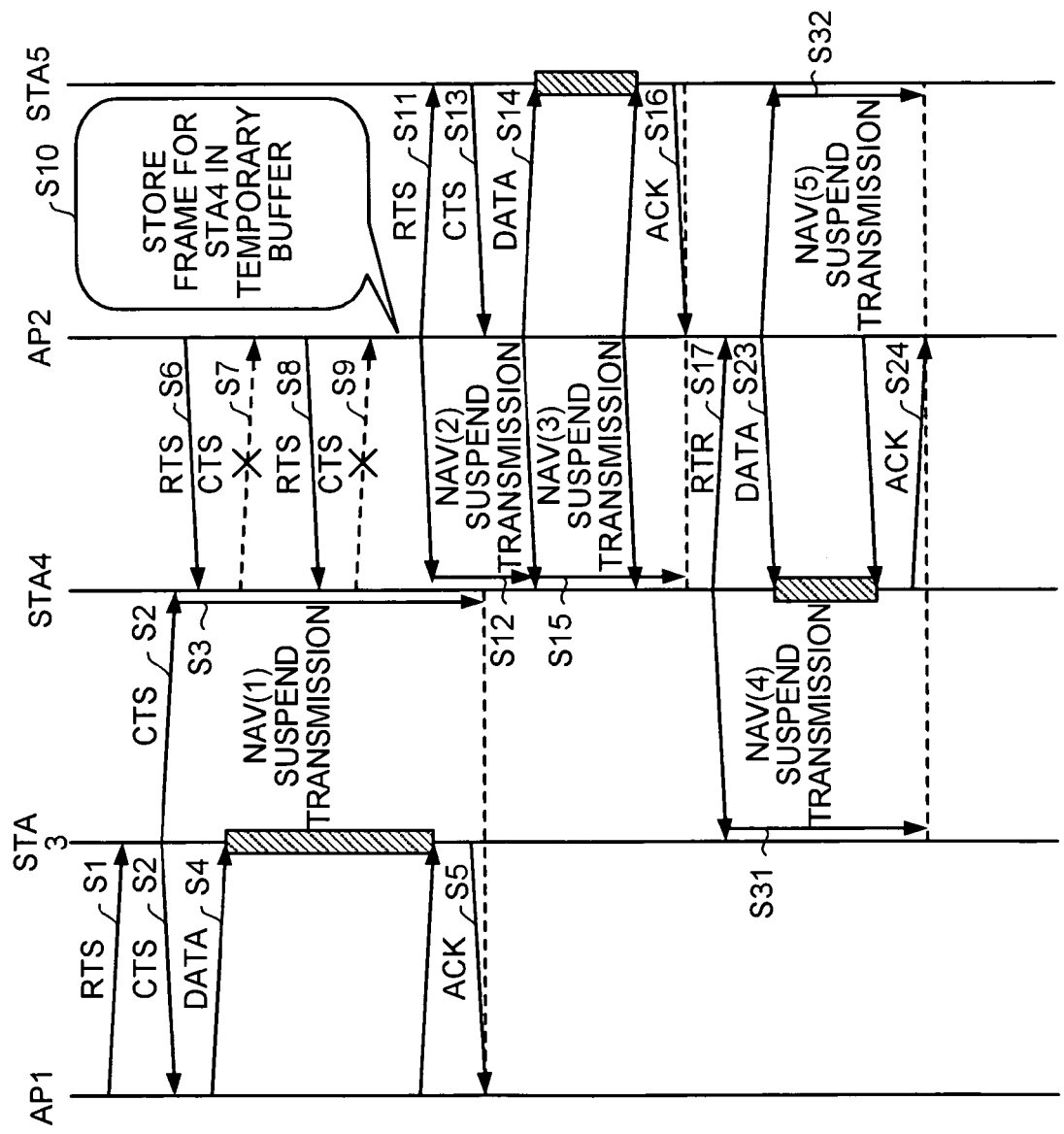
FIG. 6 depicts a communication method according to a second embodiment.

The communication method according to the second embodiment will be explained specifically, with reference to the accompanying drawings. FIG. 6 depicts the communication method according to the second embodiment only the operation different from that of the first embodiment will be explained below.

Since the STA4 could not transmit the CTS frame due to the influence of the hidden terminal, in spite of having received the RTS frame from the AP2 in the past (steps S6 and S8), the STA4 now in the transmission-enabled state in the processing at step S16 transmits the RTR frame to the AP2 for requesting the AP2 to retransmit the RTS frame (step S17). On the other hand, the STA3 is turned to the transmission-suspended state, for example, until the reception processing of the STA4 finishes, based on the NAV included in the RTR frame at step S17 (step S31).

The AP2 having received the RTR frame in the processing at step S17 reads the DATA frame temporarily stored in the processing at step S10 and transmits the DATA frame to the STA4 (step S23). On the other hand, the STA5 is turned to the transmission-suspended state, for example, until the reception processing of the STA4 finishes, based on the NAV included in the DATA frame at step S23 (step S20).

Lastly, the STA4 having received the DATA frame sends back the ACK frame to the AP2 (step S24). At this point in time, the transmission-suspended state of the STA3 and the STA5 is cancelled, and changed to the transmission-enabled state.

Thus, in the second embodiment, when the base station receives the RTR frame, the RTS/CTS procedure executed in the first embodiment is omitted. Accordingly, the band is not occupied by the RTS/CTS procedure, thereby further preventing a drop in the throughput.

Figure 7:
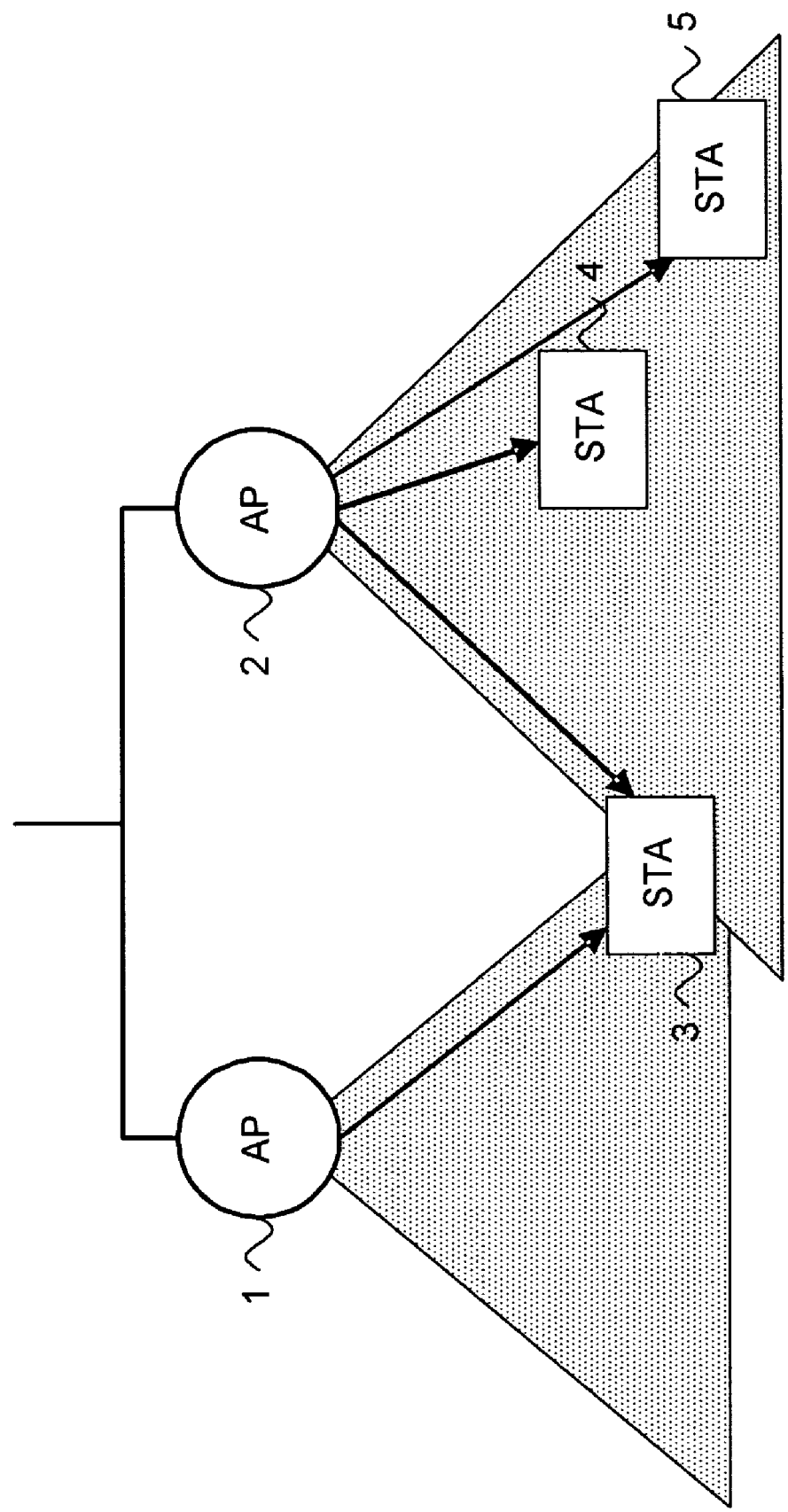
FIG. 7 depicts the configuration of a communication system capable of realizing the communication method according to the present invention.

A communication method according to a third embodiment of the present invention will be explained next. FIG. 7 depicts the configuration of a communication system capable of realizing the communication method according to the present invention, wherein the communication status between the AP and the STA, and the communication status of the AP using the same frequency are shown. In this communication system, a case that packet communication is carried out in the state that the STA3 belongs to the AP1, and the STA4 and the STA5 belong to the AP2 is assumed. The AP2 is located in the communication range of the STA3, and the STA3 is located in the interference range of the AP2. The respective frame formats used in the third embodiment are the same as shown in FIGS. 2, 3, and 4 in the first embodiment.

Figure 8:
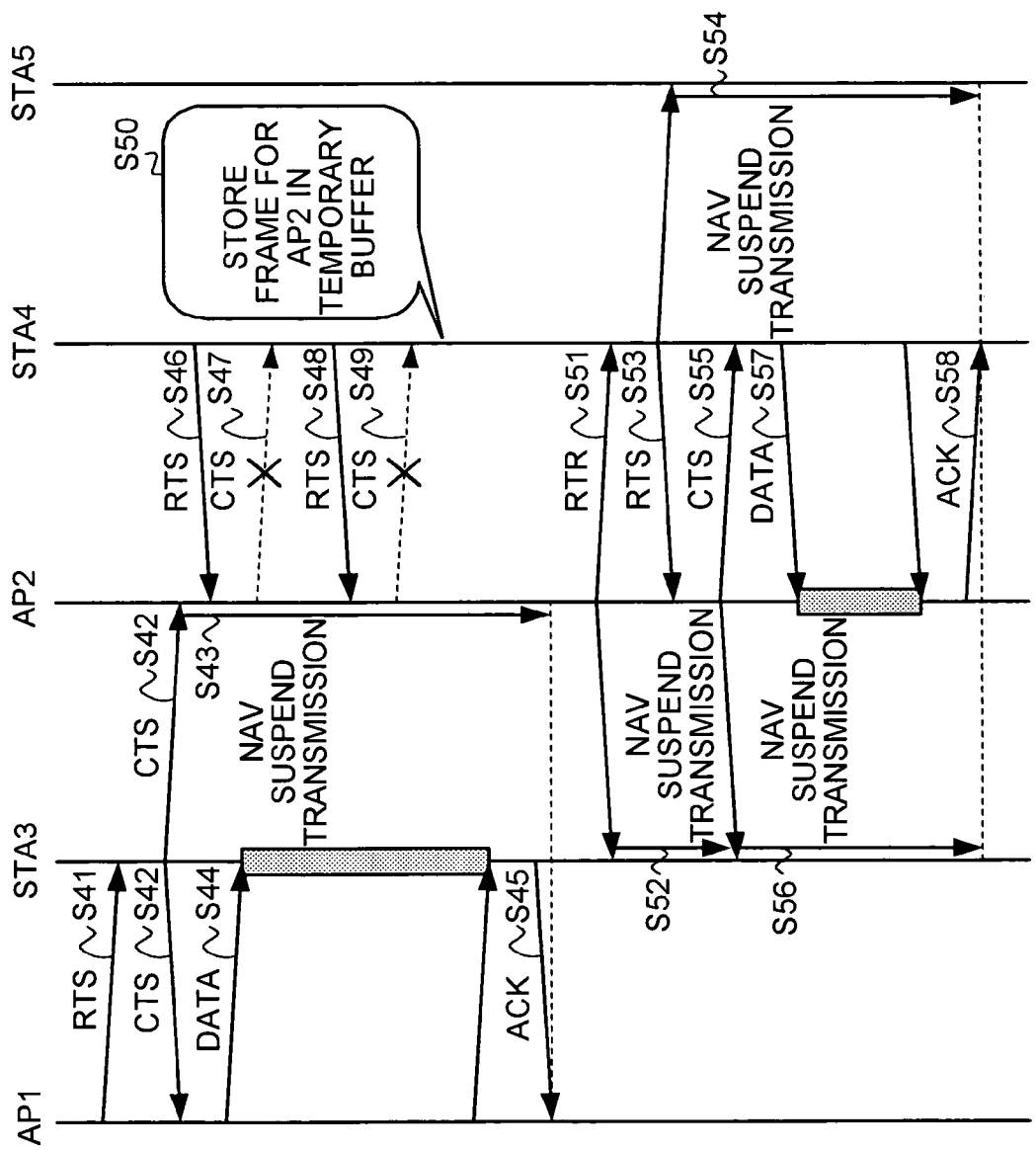
FIG. 8 depicts a communication method according to a third embodiment.

The communication method according to the third embodiment will be explained specifically with reference to the accompanying drawings. FIG. 8 depicts the communication method according to the third embodiment. The communication method between the AP and the STA in the wireless LAN system based on the IEEE802.11 will be explained below as an example. The time axis is plotted on the Y-axis, and arrows express the shift of a frame from the AP to the STA, or a frame from the STA to the AP.

Firstly, the AP1 transmits the RTS frame, which is a control frame in IEEE802.11, to the STA3 (step S41 in FIG. 8). The STA3 transmits the CTS frame to the AP1 (step S42). Since the respective frames include the virtual carrier sense information referred to as NAV, radio terminals other than the destination address are turned to the transmission-suspended state until the time specified in the NAV. That is, since the AP2 is in the communication range of the STA3, the AP2 is turned to the transmission-suspended state (step S43).

The AP1 having received the CTS frame transmits the DATA frame to the STA3 (step S44). The STA3 having received the DATA frame sends back the ACK frame to the AP1 (step S45). According to the IEEE802.11, RTS/CTS is used as the method of solving the problem of a hidden terminal.

On the other hand, the AP2 having received the CTS frame from the STA3 in the processing at step S42 is turned to the transmission-suspended state (step S43). Therefore, even when having received the RTS frame from the STA4 (step S46), the AP2 cannot send back the CTS frame to the STA4 (step S7). Since the CTS frame is not sent back to the STA4 even after the predetermined time has passed, the STA4 retransmits the RTS frame (step S48). The AP2 cannot send back the CTS frame to the STA4 as in the last occasion, since it is still in the transmission-suspended state (step S49).

In the third embodiment, when the number of retransmission reaches two, the STA4 temporarily stores the DATA frame for the AP2, for example, in a predetermined buffer (step S50). While a case that the number of retransmission is two is explained in the third embodiment as an example, the number of retransmission is not limited thereto. Furthermore, if there is DATA for another radio terminal or base station, the communication with the other radio terminal or base station can be carried out preferentially.

After the transmission-suspended state at step S43 is cancelled and changed to the transmission-enabled state, the AP2, which could not transmit the CTS frame in spite of having received the RTS frame from the STA4 in the past (steps S46 and S48), transmits the RTR frame to the STA4 to request the STA4 to retransmit the RTS frame (step S51). On the other hand, the STA3 is turned to the transmission-suspended state based on the NAV included in the RTR frame at step S51, for example, until the reception finish time of the CTS frame from the AP2, (step S52).

The STA4 having received the RTR frame in the processing at step S51 transmits the RTS frame to the AP2 in response thereto (step S53). On the other hand, the STA5 is turned to the transmission-suspended state, for example, until the reception processing of the STA4 finishes, based on the NAV included in the RTS frame at step S53 (step S54).

Subsequently, the AP2 having received the RTS frame in the processing at step S53 transmits the CTS frame to the STA4 (step S55). On the other hand, the STA3 extends the transmission-suspend-period, according to need, based on the NAV in the CTS frame addressed to the STA4 (step S56).

The STA4 having received the CTS frame in the processing at step S55 reads the DATA frame temporarily stored in the processing at step S50 and transmits the DATA frame to the AP2 (step S57). Lastly, the AP2 having received the DATA frame sends back the ACK frame to the STA4 (step S58). At this point in time, the transmission-suspended state of the STA3 and the STA5 is cancelled, and changed to the transmission-enabled state.

In this embodiment, a case that a hidden terminal appears due to a radio terminal adjacent to the base station, which operates in the same frequency, has been explained. However, for example, the same procedure can be applied to a case that a radio terminal cannot perform transmission processing, because the base station operating in the same frequency operates within the interference range. Furthermore, even when the base station receives a frame from a radio terminal connected by carrier sense, but is turned to the transmission-suspended state immediately after receiving the frame, the same procedure can be applied by transmitting the RTR frame when the base station is turned to the transmission-enabled state.

Furthermore, even in a sequence in which the RTS/CTS procedure as the measures against hidden terminals and the interference problem is not performed, the same procedure can be applied by transmitting the RTR frame. In this case, the processing at steps S46 to S49 is replaced by the retransmission processing of the DATA frame, and after the transmission of the RTR frame, only the procedure at step S57 (DATA frame) and step S58 (ACK frame) is performed. Furthermore, while the access method based on the CSMA/CA has been explained in this embodiment, the same procedure can be also applied to the access method based on the polling control, by reserving polling time within the RTR frame and reserving delivery of the reception frame. In this case, a field in which the delivery reservation is performed is added to the RTR frame. In the configuration of the communication system, it is assumed herein that the base station can be a particular radio terminal, and a radio terminal can be the base station, in the first and the second embodiments.

In the third embodiment, when a particular base station is in the transmission-suspended state due to the influence of a hidden terminal or interference, in spite of having an access from a radio terminal, the base station transmits the RTR frame for requesting the radio terminal to retransmit the DATA frame, which could not been received, when the base station is turned to the transmission-enabled state, so that the radio terminal retransmits the past DATA frame. Accordingly, an uplink packet from the radio terminal can be efficiently received.

A communication method according to a fourth embodiment of the present invention will now be explained. Since the configuration of the communication system is the same as that of FIG. 7 in the third embodiment, like reference numerals are designated with like parts, and explanation thereof is omitted. The respective frame formats used in the fourth embodiment are the same as those of FIGS. 2, 3, and 4 in the first embodiment.

Figure 9:
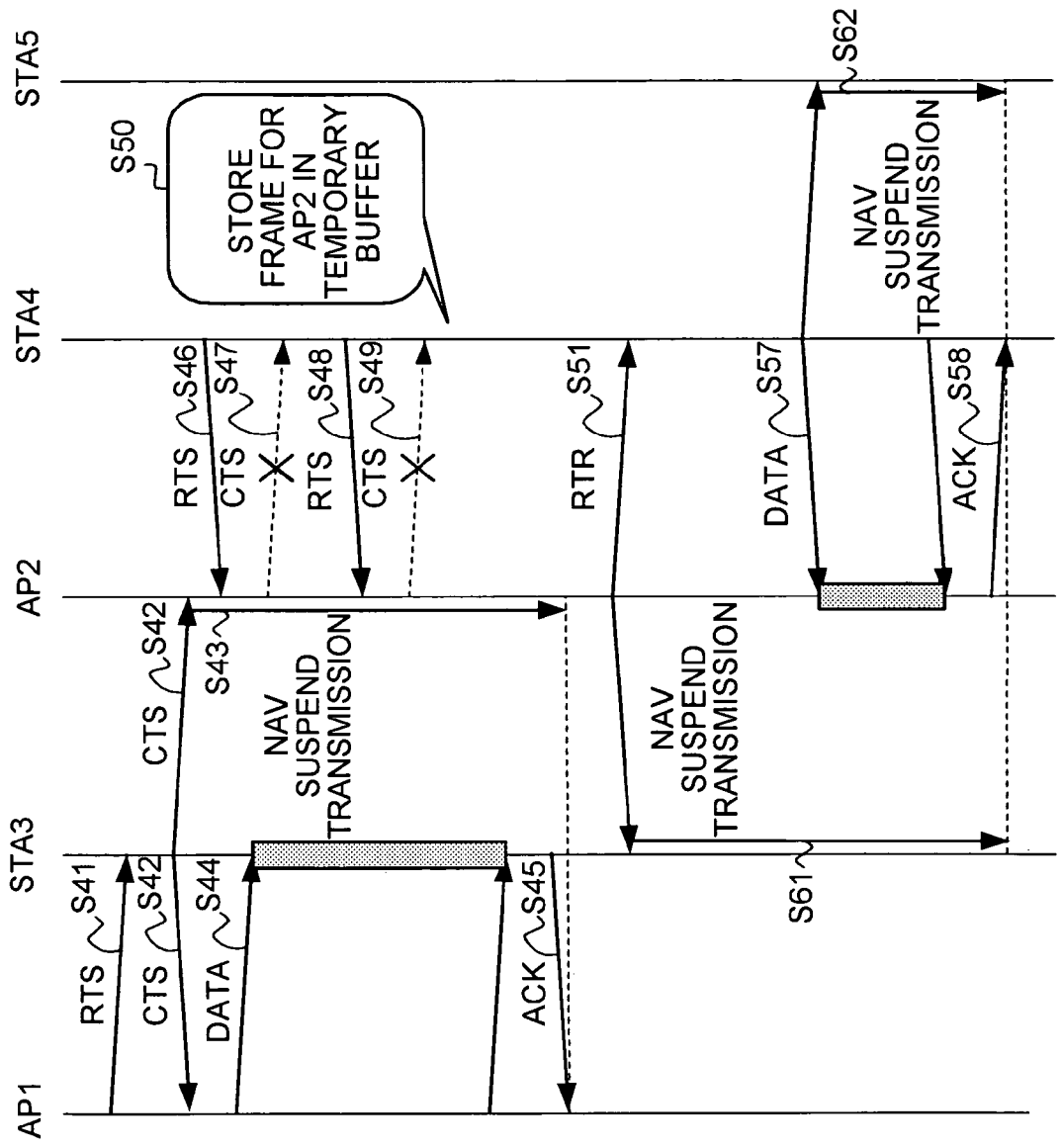
FIG. 9 depicts a communication method according to a fourth embodiment.

The communication method according to the fourth embodiment will be explained specifically, with reference to the accompanying drawings. FIG. 9 depicts the communication method according to the fourth embodiment. Only the operation different from that of the third embodiment will be explained below.

After the transmission-suspended state at step S43 has been cancelled, the AP2 in the transmission-enabled state, which could not transmit the CTS frame in spite of having received the RTS frame from the STA4 in the past (steps S46 and S48), transmits the RTR frame to the STA4 to request the STA4 to retransmit the RTS frame (step S51). On the other hand, the STA3 is turned to the transmission-suspended state based on the NAV included in the RTR frame at step S51, for example, until the reception processing of the AP2 finishes (step S61).

The STA4 having received the RTR frame in the processing at step S51 reads the DATA frame temporarily stored at step S50, and transmits the DATA frame to the AP2 (step S57). On the other hand, the STA5 is turned to the transmission-suspended state, for example, until the reception processing of the AP2 finishes, based on the NAV included in the DATA frame at step S57 (step S62).

Lastly, the AP2 having received the DATA frame sends back the ACK frame to the STA4 (step S58), and at this point in time, the transmission-suspended state of the STA3 and the STA5 is cancelled, and changed to the transmission-enabled state.

Thus, in the fourth embodiment, when the radio terminal receives the RTR frame, the RTS/CTS procedure executed in the third embodiment is omitted. Accordingly, the band is not occupied by the RTS/CTS procedure, thereby further preventing a drop in the throughput.

Figure 10:
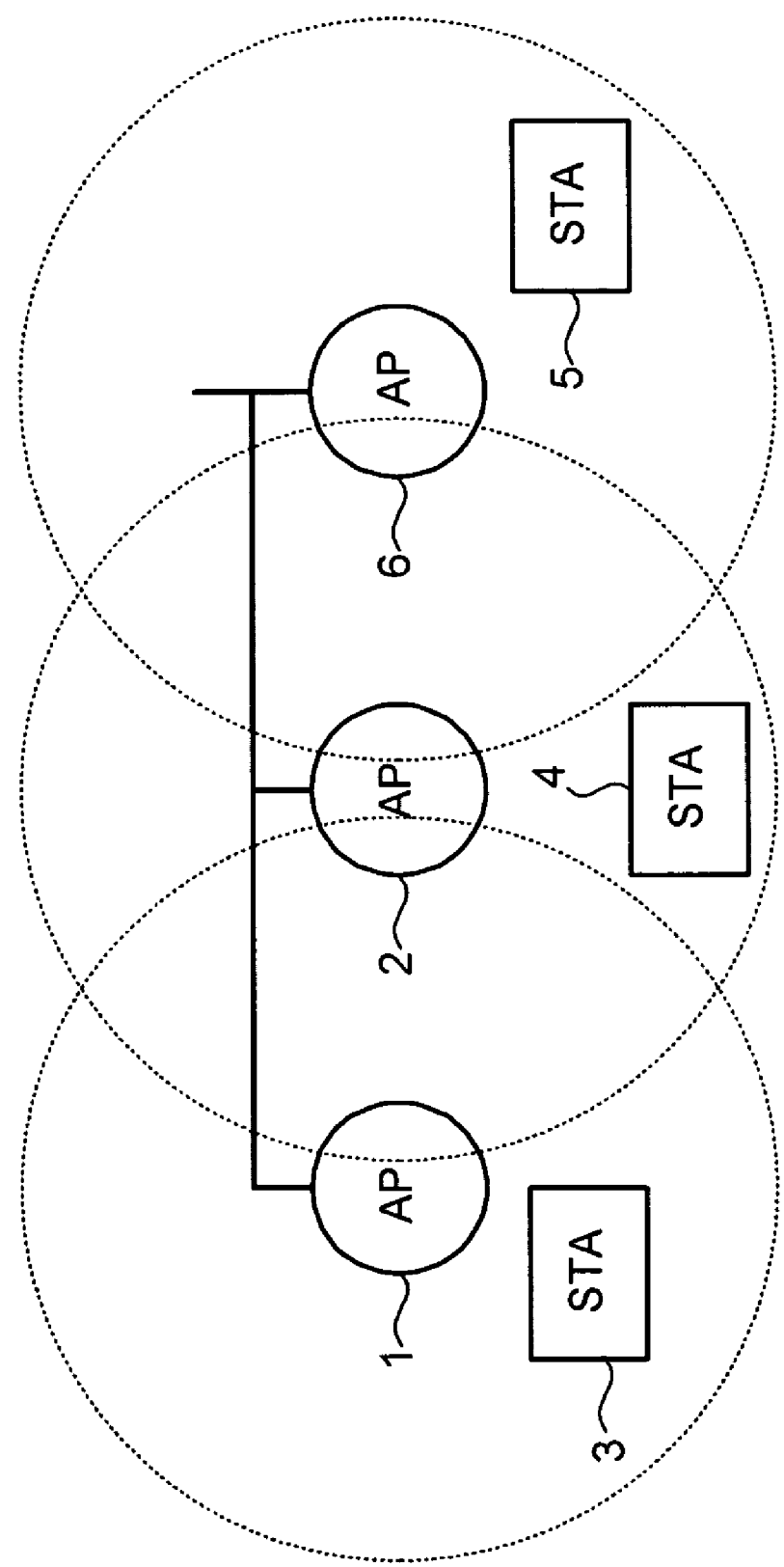
FIG. 10 depicts the configuration of a communication system capable of realizing the communication method according to the present invention.

A communication method according to a fifth embodiment of the present invention will be explained next. FIG. 10 depicts the configuration of a communication system capable of realizing the communication method according to the present invention, wherein the communication status between the APs, and STAs belonging to the respective APs are shown. In the communication method between the AP and the STA is the same as in the first to the fourth embodiments. In this embodiment, the relation between the AP and the STA will be explained, wherein the AP can be a particular STA, or the STA can be an AP. The APs can be connected by another network, or can be unconnected.

In this communication system, it is assumed that the base station communicates with other base stations by using the same channel or a channel affected by interference. Specifically, an AP1 is located in the interference range of an AP2, the AP2 is located in the interference ranges of an AP6 and the AP1, and the AP6 is located in the interference range of the AP2. The respective frame formats used in the fifth embodiment are the same as shown in FIGS. 2, 3, and 4 in the first embodiment.

Figure 11:
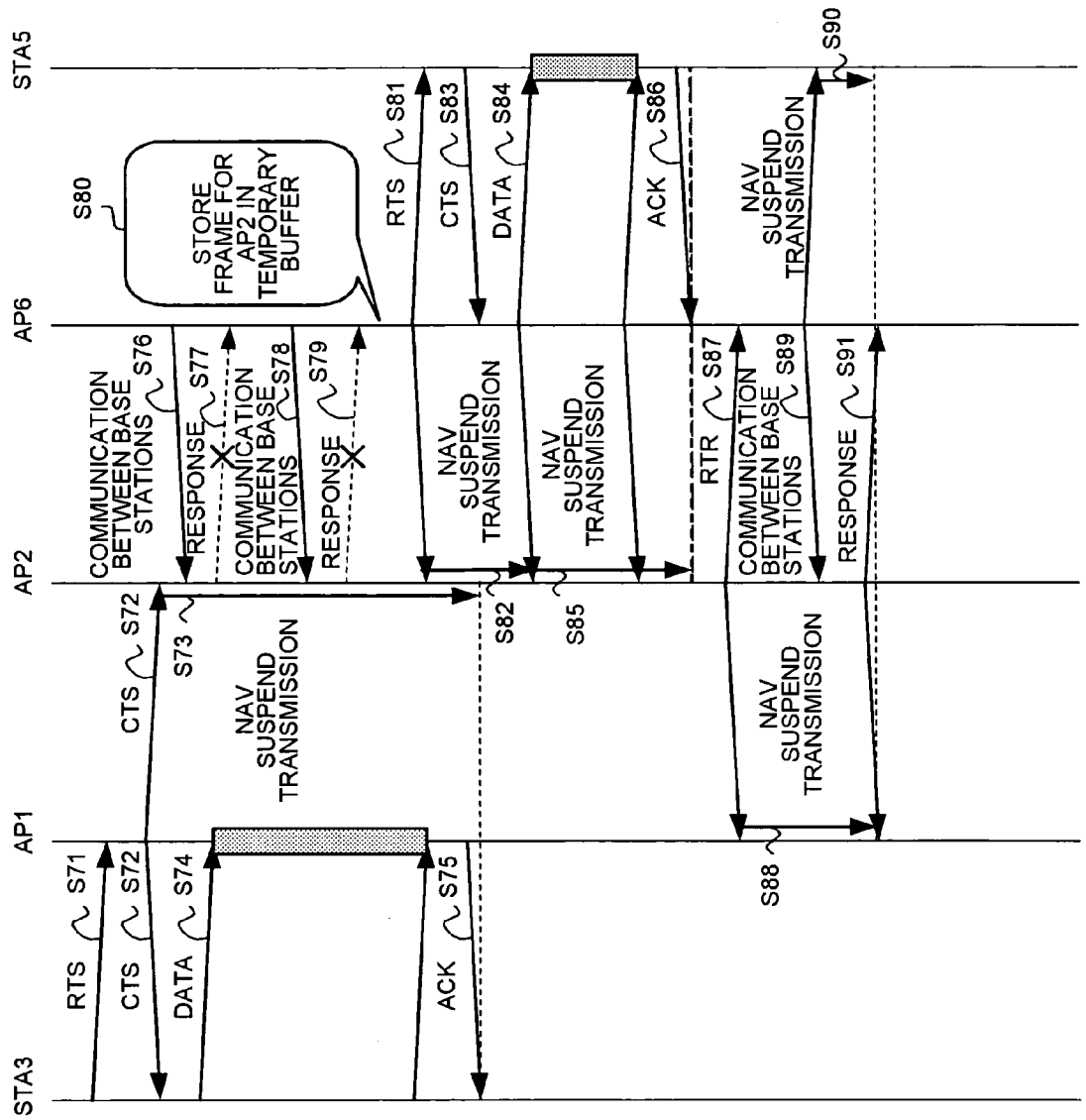
FIG. 11 depicts a communication method according to a fifth embodiment.

The communication method according to the fifth embodiment will be explained specifically with reference to the accompanying drawings. FIG. 11 depicts the communication method according to the fifth embodiment. The communication method between the APs in the wireless LAN system based on the IEEE802.11 will be explained below as an example.

Firstly, the STA3 transmits the RTS frame, which is a control frame in IEEE802.11, to the AP1 (step S71 in FIG. 11). The AP1 then transmits the CTS frame to the STA3 (step S72). Since the AP2 is within the communication range of the AP1, the AP2 is turned to the transmission-suspended state according to the NAV (step S73).

The STA3 having received the CTS frame transmits the DATA frame to the AP1 (step S74). The AP1 having received the DATA frame sends back the ACK frame to the STA3 (step S75).

On the other hand, the AP2 having received the CTS frame from the AP1 in the processing at step S72 is turned to the transmission-suspended state according to the NAV (step S73). Therefore, as shown in FIG. 11, even when having received the frame for communication between base stations from the AP6 (step S76), the AP2 cannot send back the response frame to the AP6 (step S77). Since the response frame is not sent back to the AP6 even after the predetermined time has passed, the AP6 retransmits the frame for communication between base stations (step S78). Since the AP2 is still in the transmission-suspended state, the AP2 cannot send back the response frame to the AP6 as in the last occasion (step S79).

In the fifth embodiment, when the number of retransmission reaches two, the AP6 temporarily stores the DATA frame for the AP2, for example, in a predetermined buffer (step S80). In the fifth embodiment, if there is DATA for another STA or AP, the communication with the other STA or AP is carried out preferentially. As shown in the FIG. 11, the communication with the STA5 is given priority, and the AP2 transmits the RTS frame to the STA5 (step S81). On the other hand, when the channel use period is ahead of the time indicated by the CTS frame at step S73 based on the NAV included in the RTS frame at step S81, the AP2 extends the transmission-suspend-period (step S82). While a case that the number of retransmission is two is explained in this embodiment as an example, the number of retransmission is not limited thereto.

Subsequently, the STA5 having received the RTS frame in the processing at step S81 transmits the CTS frame to the AP6 (step S83). The AP6 having received the CTS frame transmits the DATA frame to the STA5 (step S84). On the other hand, the AP2 extends the transmission-suspend-period, according to need, based on the NAV in the DATA frame addressed to the STA5 (step S85). Thereafter, the STA5 having completed reception of the DATA frame sends back the ACK frame to the AP6 (step S86). At this point in time, the transmission-suspended state of the AP2 renewed at step S85 is cancelled, and the AP2 is turned to transmission-enabled state.

The AP2 in the transmission-enabled state, which could not transmit the response frame in spite of having received the frame for communication between base stations from the AP6 in the past (steps S76 and S78), transmits the RTR frame to the AP6 to request the AP6 to retransmit the frame for communication between base stations (step S87). On the other hand, the AP1 is turned to the transmission-suspended state based on the NAV included in the RTR frame at step S87, for example, until the reception finish time of the response frame from the AP2 (step S88). While frame transmission for the communication between base stations is immediately requested by the RTR frame in this embodiment, a method of reserving the reception time can be also used in the communication system based on the polling method.

The AP6 having received the RTR frame in the processing at step S87 transmits the frame for communication between base stations to the AP2 (step S89). On the other hand, the STA5 is turned to the transmission-suspended state, for example, until the reception processing of the AP2 finishes, based on the NAV included in the frame for communication between base stations at step S89 (step S90). The AP2 having completed reception of the frame for communication between base stations sends back the response frame to the AP6 (step S91), and at this point in time, the transmission-suspended state of the STA5 and the AP1 is cancelled, and the STA5 and the AP1 are turned to the transmission-enabled state.

Thus, in the fifth embodiment, when a particular radio terminal (or base station) is in the transmission-suspended state, in spite of having an access from a base station (or a radio terminal), the radio terminal (or the base station) transmits the RTR frame for requesting the base station (or the radio terminal) to retransmit the frame (including DATA and frame for communication between base stations), which could not be received, when the radio terminal (or the base station) is turned to the transmission-enabled state, so that the base station (or the radio terminal) retransmits the past frame. Accordingly, a packet can be efficiently received, thereby avoiding a considerable drop in the throughput.

Even in a sequence in which the RTS/CTS procedure is not carried out as the measure against the hidden terminal and the interference problem, the similar procedure can be applied by transmitting the RTR frame. While the access method based on the CSMA/CA has been explained in the fifth embodiment, the similar procedure can be also applied to the access method based on polling control, by reserving polling time within the RTR frame and reserving delivery of the reception frame. In this case, a field in which the delivery reservation is performed is added to the RTR frame. While in the fifth embodiment, the RTR frame and the DATA frame between the base stations are used in the same frequency as that of other frames, the RTR frame and the DATA frame can be also used in other frequencies.

Figure 12:
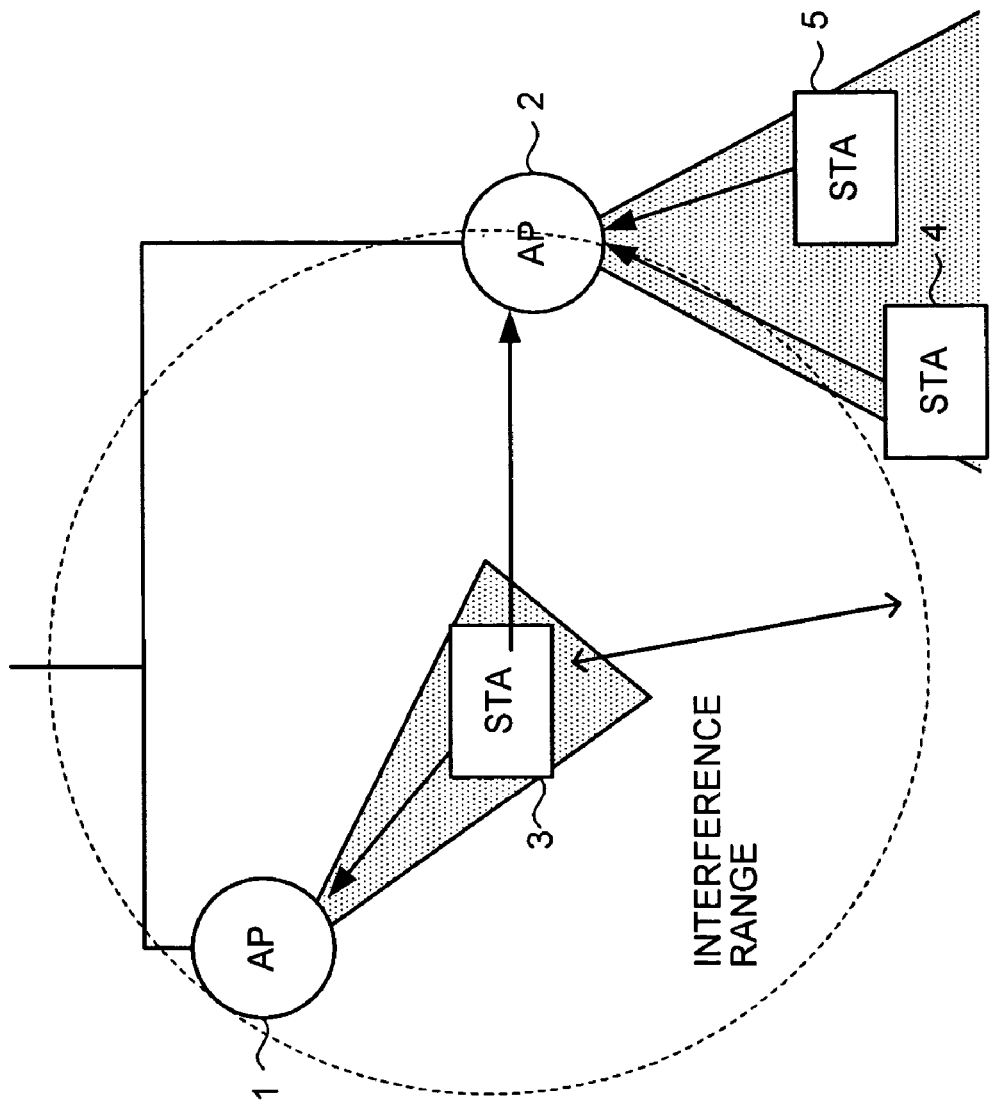
FIG. 12 depicts the configuration of the communication system capable of realizing a communication method according to the present invention.

A communication method according to a sixth embodiment of the present invention will be explained. FIG. 12 depicts the configuration of the communication system capable of realizing the communication method according to the present invention, wherein the communication state between the AP and the STA is shown. The STA3 belongs to the AP1, and the STA4 and the STA5 belong to the AP2, and communicate with each other. In FIG. 12, the AP1 is located in the communication range of the STA3, and the AP2 is located in the interference range of the STA3. It is assumed herein that all terminals use the same channel.

Figure 13:
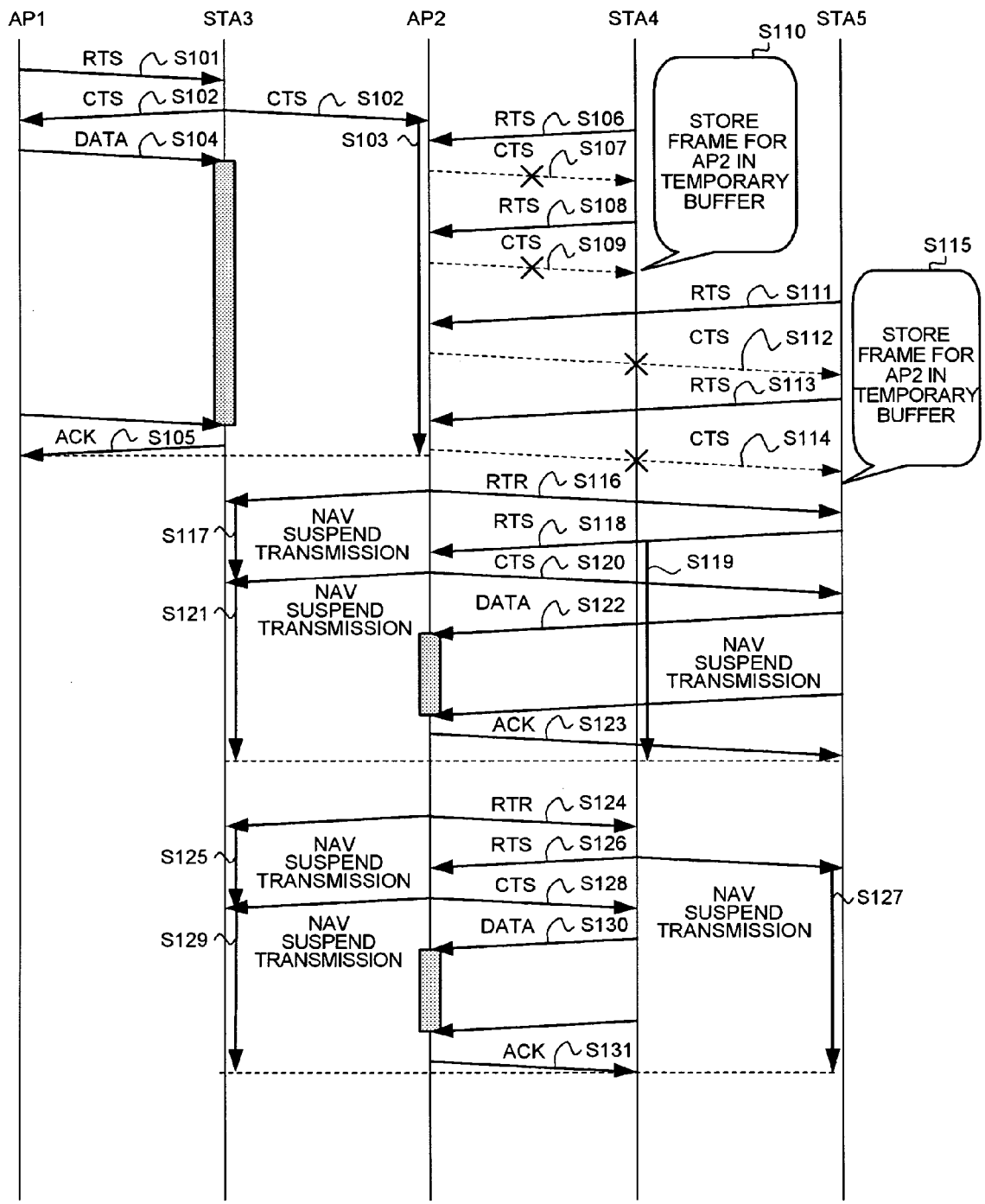
FIG. 13 depicts a communication method according to a sixth embodiment.

The communication method according to the sixth embodiment will be explained specifically with reference to the accompanying drawings. FIG. 13 depicts the communication method according to the sixth embodiment. The communication method between the AP and the STA based on the IEEE802.11e, which is the standard for applying QoS to the wireless LAN, will be explained below as an example.

Firstly, the AP1 transmits the RTS frame, which is a control frame in the IEEE802.11, to the STA3 (step S101 in FIG. 13). The STA3 then transmits the CTS frame to the AP1 (step S102). Since the AP2 is within the communication range of the STA3, the AP2 is turned to the transmission-suspended state according to the NAV (step S103).

The AP1 having received the CTS frame transmits the DATA frame to the STA3 (step S104). The STA3 having received the DATA frame sends back the ACK frame to the AP1 (step S105).

On the other hand, the AP2 having received the CTS frame from STA3 in the processing at step S102 is turned to the transmission-suspended state according to the NAV (step S103). Therefore, as shown in FIG. 13 for example, even when having received the RTS frame from the STA4 (step S106), the AP2 cannot send back the CTS frame to the STA4 (step S107). Since the CTS frame is not sent back to the STA4 even after the predetermined time has passed, the STA4 retransmits the RTS frame (step S108). Since the AP2 is still in the transmission-suspended state, the AP2 cannot send back the CTS frame to the STA4 as in the last occasion (step S109).

In the sixth embodiment, when the number of retransmission reaches two, the STA4 temporarily stores the DATA frame for the AP2, for example, in a predetermined buffer (step S110). While an example in which the number of retransmission is two is explained in the sixth embodiment, the number of retransmission is not limited to two. Furthermore, if there is DATA for another radio terminal or the base station, the communication with the other radio terminal or base station can be carried out preferentially.

Since the AP2 is in the transmission-suspended state (step S103), even when having received the RTS frame from the STA5 (step S111), the AP2 cannot send back the CTS frame to the STA5 (step S112). Since the CTS frame is not sent back to the STA5 even after the predetermined time has passed, the STA4 retransmits the RTS frame (step S113). The AP2 cannot send back the CTS frame to the STA5 as in the last occasion, since it is still in the transmission-suspended state (step S114).

When the number of retransmission reaches two, the STA5 temporarily stores the DATA frame for the AP2, for example, in a predetermined buffer (step S115).

After the transmission-suspended state at step S103 has been cancelled, the AP2 in the transmission-enabled state, which could not transmit the CTS frame in spite of having received the RTS frames from the STA4 and the STA5 in the past (steps S106, S108, S111, and S113), transmits the RTR frame first to the STA5 to request the STA5 to retransmit the RTS frame (step S116). On the other hand, the STA3 is turned to the transmission-suspended state based on the NAV included in the RTR frame at step S116, for example, until the reception finish time of the CTS frame from the AP2, (step S117). In the sixth embodiment, for the convenience sake, the DATA frame to be transmitted from the STA5 to the AP2 is given priority. However, it is not limited thereto, and if the DATA frame to be transmitted from the STA4 to the AP2 has a higher priority, the AP2 transmits the RTR to the STA4 first at step S116.

The STA5 having received the RTR frame in the processing at step S116 transmits the RTS frame to the AP2 in response thereto (step S118). On the other hand, the STA4 is turned to the transmission-suspended state, for example, until the reception processing of the STA5 finishes, based on the NAV included in the RTS frame at step S118 (step S119).

The AP2 having received the RTS frame in the processing at step S118 transmits the CTS frame to the STA5 (step S120). On the other hand, the STA3 extends the transmission-suspend-period, according to need, based on the NAV in the CTS frame addressed to the STA5 (step S121).

The STA5 having received the CTS frame in processing at step S120 reads the DATA frame temporarily stored in the processing at step S115 and transmits the DATA frame to the AP2 (step S112). Lastly, the AP2 having received the DATA frame sends back the ACK frame to the STA5 (step S123). At this point in time, the transmission-suspended state of the STA3 and the STA4 is cancelled, and changed to the transmission-enabled state.

Subsequently, after having sent back the ACK frame to the STA5 (step S123), the AP2 transmits the RTR frame to the STA4 (step S124). On the other hand, the STA3 is turned to the transmission-suspended state based on the NAV included in the RTR frame at step S124, for example, until the reception finish time of the CTS frame from the AP2, (step S125).

The STA4 having received the RTR frame in the processing at step S124 transmits the RTS frame to the AP2 in response thereto (step S126). On the other hand, the STA5 is turned to the transmission-suspended state, for example, until the reception processing of the STA4 finishes, based on the NAV included in the RTS frame at step S126 (step S127).

The AP2 having received the RTS frame in the processing at step S126 transmits the CTS frame to the STA4 (step S128). On the other hand, the STA3 extends the transmission-suspend-period, according to need, based on the NAV in the CTS frame addressed to the STA4 (step S129).

The STA4 having received the CTS frame in processing at step S128 reads the DATA frame temporarily stored in the processing at step S110 and transmits the DATA frame to the AP2 (step S130). Lastly, the AP2 having received the DATA frame sends back the ACK frame to the STA4 (step S131). At this point in time, the transmission-suspended state of the STA3 and the STA5 is cancelled, and changed to the transmission-enabled state.

In this embodiment, a case that a hidden terminal appears due to a radio terminal adjacent to the base station, which operates in the same frequency, has been explained. However, for example, the same procedure can be applied to a case that a radio terminal cannot perform transmission processing, because the base station operating in the same frequency operates within the interference range. Furthermore, even when the base station has received a frame from a radio terminal connected by carrier sense, but immediately after the reception, transmission processing is disabled, the same procedure can be applied by transmitting the RTR frame when the base station is turned to the transmission-enabled state.

Furthermore, even in a sequence in which the RTS/CTS procedure as the measures against hidden terminals and the interference problem is not performed, the same procedure can be applied by transmitting the RTR frame. In this case, the processing at steps from S106 to S109, and from S111 to S114 is replaced by the retransmission processing of the DATA frame, and after the transmission of the RTR frame, only the procedure at step S122 (DATA frame) and step S123 (ACK frame), and at step S130 (DATA frame) and step S131 (ACK frame) is performed. Furthermore, while the access method based on the CSMA/CA has been explained in this embodiment, the same procedure can be also applied to the access method based on the polling control, by reserving polling time within the RTR frame and reserving delivery of the reception frame. In this case, a field for delivery reservation is added to the RTR frame. In the configuration of the communication system, it is assumed herein that the base station can be a particular radio terminal, and a radio terminal can be the base station. When the priority level of the DATA frame temporarily stored in the buffer drops with the lapse of time, the DATA frame stored in the buffer can be cancelled, or rescheduled for the transmission at the next time onward. Such a case is handled by adding a field indicating the priority level to the RTR frame of the DATA frame.

In the sixth embodiment, when a particular base station is in the transmission-suspended state due to the influence of a hidden terminal or interference, in spite of having an access from a radio terminal, the base station sequentially transmits the RTR frame for requesting the radio terminal having data of the highest priority level to retransmit the DATA frame, which could not be received, when the base station is turned to the transmission-enabled state, so that the respective radio terminals sequentially retransmit the past DATA frame. Accordingly, an uplink packet from a plurality of radio terminals can be efficiently received.

INDUSTRIAL APPLICABILITY

The communication method of the present invention is useful for a digital radio communication system adopting the CSMA, which is one of the random access technology, and particularly, suitable as a method for avoiding a collision of wireless packets.

The invention claimed is:

1. A communication method for a carrier-sense-multiple-access (CSMA) network including a radio terminal and a base station to which the radio terminal belongs, the communication method supporting request-to-send/clear-to-send (RTS/CTS) to prevent a collision of packets due to a hidden terminal, the communication method comprising:
RTS-transmitting including the base station transmitting a request-to-send (RTS) frame to the radio terminal during a transmission-suspend-period in which the radio terminal suspends transmission to prevent the collision of packets;
wherein when the base station does not receive a clear-to-send (CTS) frame from the radio terminal due to a suspension of the transmission, and when there is another data frame to be transmitted to another radio terminal, the base station performs a communication with the another radio terminal in priority to a communication with the radio terminal and the radio terminal extends the transmission-suspend-period based on a usage period for which the another radio terminal uses a channel;
RTR-transmitting including the radio terminal transmitting a request-to-receive (RTR) frame to the base station after the transmission-suspend-period has elapsed; and
data-transmitting including the base station transmitting a data frame to the radio terminal in response to the RTR frame.

2. The communication method according to claim 1, further comprising storing including the base station temporarily storing the data frame to be transmitted to the radio terminal.

3. The communication method according to claim 2, wherein the storing includes the base station storing the data frame after the base station transmits the RTS frame to the radio terminal for a predetermined number of times.

4. The communication method according to claim 1, wherein when a plurality of base stations or a plurality of other radio terminals transmit a plurality of RTS frames, respectively, to the radio terminal during the transmission-suspend-period, the RTR-transmitting includes the radio terminal transmitting the RTR frame to the base stations or to the other radio terminals sequentially in descending order of priority.

5. The communication method according to claim 1, further comprises: the base station transmitting a request-to-send (RTS) frame to the radio terminal in response to the RTR frame;
wherein the data-transmitting including the base station does not transmit a data frame to the radio terminal in response to the RTR frame;
the radio terminal transmitting a clear-to-send (CTS) frame to the base station in response to the RTS frame;
the base station transmitting the data frame to the radio terminal in response to the CTS frame; and
the radio terminal transmitting an acknowledgement (ACK) frame after having received the data frame.

6. The communication method according to claim 1, further includes:
the radio terminal transmitting an acknowledgement (ACK) frame after having received the data frame.

7. The communication method according to claim 5, wherein another radio terminal, which receives the RTR frame from the radio terminal or communicates with the base station that has received the RTR frame from the radio terminal, suspends transmission to prevent the collision of packets until the data-transmitting is completed.

8. The communication method according to claim 6, wherein another radio terminal, which receives the RTR frame from the radio terminal or communicates with the base station that has received the RTR frame from the radio terminal, suspends transmission to prevent the collision of packets until the data-transmitting is completed.

9. A radio terminal employing carrier-sense-multiple-access (CSMA) with request-to-send/clear-to-send (RTS/CTS) to prevent a collision of packets due to a hidden terminal, the radio terminal comprising:
- an RTS-receiving unit that receives a request-to-send (RTS) frame from a base station, to which the radio terminal belongs, during a transmission-suspend-period in which the radio terminal suspends transmission to prevent the collision of the packets; and
- an RTR-transmitting unit that transmits a request-to-receive (RTR) frame to the base station after the transmission-suspend-period has elapsed wherein when the RTS-receiving unit receives a plurality of RTS frames from a plurality of base stations or from a plurality of other radio terminals during the transmission-suspend-period, the RTR-transmitting unit transmits the RTR frame to the base stations or to the other radio terminals sequentially in descending order of priority.

10. The radio terminal according to claim 9, further comprising an extending unit that extends, when the base station performs a communication with another radio terminal in priority to a communication with the radio terminal during the transmission-suspend-period, the transmission-suspend-period, based on a usage period for which the another radio terminal uses a channel.

11. The radio terminal according to claim 9, further comprising:
- a CTS-transmitting unit that transmits a clear-to-send (CTS) frame to the base station in response to another RTS frame that is transmitted from the base station in response to the RTR frame; and
- an ACK-transmitting unit that transmits an acknowledgement (ACK) frame to the base station after having received a data frame that is transmitted from the base station in response to the CTS frame.

12. The radio terminal according to claim 9, further comprising an ACK-transmitting unit that transmits an acknowledgement (ACK) frame to the base station after having received a data frame that is transmitted from the base station in response to the RTR frame.

13. A base station employing carrier-sense-multiple-access (CSMA) with request-to-send/clear-to-send (RTS/CTS), the base station comprising:
- an RTS-transmitting unit that transmits a request-to-send (RTS) frame to a radio terminal during a transmission-suspend-period in which the radio terminal suspends transmission to prevent a collision of packets;
- an RTR-receiving unit that receives a request-to-receive (RTR) frame from the radio terminal after the transmission-suspend-period has elapsed;
- an RTS-retransmitting unit that retransmits the RTS frame to the radio terminal in response to the RTR frame; and
- a data-transmitting unit that transmits a data frame to the radio terminal in response to a clear-to-send (CTS) frame that is transmitted from the radio terminal in response to the RTS frame retransmitted.

14. The base station according to claim 13, further comprising a buffer that temporarily stores the data frame to be transmitted to the radio terminal.

15. The base station according to claim 14, wherein the buffer stores the data frame after the RTS-transmitting unit transmits the RTS frame to the radio terminal for a predetermined number of times.

16. The base station according to claim 13, wherein when the CTS frame is not transmitted from the radio terminal in response to the RTS frame transmitted due to a suspension of the transmission, and when there is another data frame to be transmitted to another radio terminal, the base station performs a communication with the another radio terminal in priority to a communication with the radio terminal.

17. A base station employing carrier-sense-multiple-access (CSMA) with request-to-send/clear-to-send (RTS/CTS), the base station comprising:
- an RTS-transmitting unit that transmits a request-to-send (RTS) frame to a radio terminal during a transmission-suspend-period in which the radio terminal suspends transmission to prevent a collision of packets;
  - wherein when a clear-to-send (CTS) frame is not transmitted from the radio terminal in response to the RTS frame transmitted due to a suspension of the transmission, and when there is another data frame to be transmitted to another radio terminal, the base station performs a communication with the another radio terminal in priority to a communication with the radio terminal, the radio terminal extends the transmission-suspend-period based on a usage period for which the another base station or the another radio terminal uses a channel;
- an RTR-receiving unit that receives a request-to-receive (RTR) frame from the radio terminal after the transmission-suspend-period has elapsed; and
- a data-transmitting unit that transmits a data frame to the radio terminal in response to the RTR frame.

18. The base station according to claim 17, further comprising a buffer that temporarily stores the data frame to be transmitted to the radio terminal.

19. The base station according to claim 18, wherein the buffer stores the data frame after the RTS-transmitting unit transmits the RTS frame to the radio terminal for a predetermined number of times.

20. A communication method for a carrier-sense-multiple-access (CSMA) network including a radio terminal and a base station to which the radio terminal belongs, the communication method supporting request-to-send/clear-to-send (RTS/CTS) to prevent a collision of packets due to a hidden terminal, the communication method comprising:
- RTS-transmitting including the radio terminal transmitting a request-to-send (RTS) frame to the base station during a transmission-suspend-period in which the base station suspends transmission to prevent the collision of packets or due to an interference;
  - wherein and when the radio terminal does not receive a clear-to-send (CTS) frame from the base station due to a suspension of the transmission, and when there is another data frame to be transmitted to another base station or to another radio terminal, the radio terminal performs a communication with the another base station or with the another radio terminal in priority to a communication with the base station, the base station extends the transmission-suspend-period based on a usage period for which the another base station or the another radio terminal uses a channel;
- RTR-transmitting including the base station transmitting a request-to-receive (RTR) frame to the radio terminal after the transmission-suspend-period has elapsed; and
- data-transmitting including the radio terminal transmitting a data frame to the base station in response to the RTR frame.

21. The communication method according to claim 20, further comprising storing including the radio terminal temporarily storing the data frame to be transmitted to the base station.

22. The communication method according to claim 21, wherein the storing includes the radio terminal storing the data frame after the radio terminal transmits the RTS frame to the base station for a predetermined number of times.

23. The communication method according to claim 20, wherein when a plurality of other base stations or a plurality of radio terminals transmit a plurality of RTS frames, respectively, to the base station during the transmission-suspend-period, the RTR-transmitting includes the base station transmitting the RTR frame to the other base stations or to the radio terminals sequentially in descending order of priority.

24. A base station employing carrier-sense-multiple-access (CSMA) with request-to-send/clear-to-send (RTS/CTS) to prevent a collision of packets due to a hidden terminal, the base station comprising:
   an RTS-receiving unit that receives a request-to-send (RTS) frame from a radio terminal belonging to the base station during a transmission-suspend-period in which the base station suspends transmission to prevent the collision of the packets or due to an interference; and
   an RTR-transmitting unit that transmits a request-to-receive (RTR) frame to the radio terminal after the transmission-suspend-period has elapsed wherein when the RTS-receiving unit receives a plurality of RTS frames from a plurality of other base stations or from a plurality of radio terminals during the transmission-suspend-period, the RTR-transmitting unit transmits the RTR frame to the other base stations or to the radio terminals sequentially in descending order of priority.

25. The base station according to claim 24, further comprising:
   a CTS-transmitting unit that transmits a clear-to-send (CTS) frame to the radio terminal in response to another RTS frame that is transmitted from the radio terminal in response to the RTR frame; and
   an ACK-transmitting unit that transmits an acknowledgement (ACK) frame to the radio terminal after having received a data frame that is transmitted from the radio terminal in response to the CTS frame.

26. A communication method for a carrier-sense-multiple-access (CSMA) network including a radio terminal, a first base station, and a second base station, the communication method supporting request-to-send/clear-to-send (RTS/CTS) to prevent a collision of packets due to a hidden terminal, the communication method comprising:
   transmitting including the second base station transmitting a frame for communication between base stations to the first base station during a transmission-suspend-period in which the first base station suspends transmission to prevent the collision of packets or due to an interference;
   wherein when the second base station does not receive a response to the frame for communication between base stations from the first base station due to a suspension of the transmission, and when there is another data frame to be transmitted to a third base station or to the radio terminal, the second base station performs a communication with the third base station or with the radio terminal in priority to a communication with the first base station, the first base station extends the transmission-suspend-period based on a usage period for which the third base station or the radio terminal uses a channel;
   transmitting including the first base station transmitting a request-to-receive (RTR) frame to the second base station after the transmission-suspend-period has elapsed; and
   transmitting including the second base station transmitting a data frame to the first base station in response to the RTR frame.

27. The communication method according to claim 26, further comprising storing including the second base station temporarily storing the data frame to be transmitted to the first base station.

28. The communication method according to claim 27, wherein the storing includes the second base station storing the data frame after the second base station transmits the frame for communication between base stations to the first base station for a predetermined number of times.

29. A base station employing carrier-sense-multiple-access (CSMA) with request-to-send/clear-to-send (RTS/CTS) to prevent a collision of packets due to a hidden terminal, the base station comprising:
   a receiving unit that receives a frame for communication between base stations from another base station during a transmission-suspend-period in which the base station suspends transmission to prevent the collision of the packets or due to an interference; and
   a transmitting unit that transmits a request-to-receive (RTR) frame to the another base station after the transmission-suspend-period has elapsed wherein when the receiving unit receives a plurality of frames for communication between base stations from a plurality of other base stations during the transmission-suspend-period, the transmitting unit transmits the RTR frame to the other base stations sequentially in descending order of priority.

30. The base station according to claim 29, further comprising:
   the transmitting unit that transmits a clear-to-send (CTS) frame to the another base station in response to another frame for communication that is transmitted from the another base station in response to the RTR frame; and
   the transmitting unit that transmits an acknowledgement (ACK) frame to the another base station after having received a data frame that is transmitted from the another base station in response to the CTS frame.

* * * * *